US012798367B2

(12) United States Patent
Yang et al.

(10) Patent No.: US 12,798,367 B2
(45) Date of Patent: Nov. 17, 2026

(54) METHOD OF CONTROLLING POWER CONNECTION DEVICE FOR FOUR-WHEEL DRIVE VEHICLE

(71) Applicant: Hyundai Transys Inc., Seosan-si (KR)

(72) Inventors: Se Dong Yang, Hwaseong-si (KR); Jong Bae Ahn, Hwaseong-si (KR); Sangheon Lee, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 330 days.

(21) Appl. No.: 18/680,123

(22) Filed: May 31, 2024

(65) Prior Publication Data

US 2025/0269720 A1 Aug. 28, 2025

(30) Foreign Application Priority Data

Feb. 26, 2024 (KR) ........................ 10-2024-0027235

(51) Int. Cl.

*B60K 23/04* (2006.01)
*B60K 17/35* (2006.01)
*B60K 23/08* (2006.01)

(52) U.S. Cl.

CPC .......... *B60K 23/0808* (2013.01); *B60K 17/35* (2013.01); *B60K 2023/043* (2013.01)

(58) Field of Classification Search

CPC ................ B60K 23/0808; B60K 17/35; B60K 2023/043

See application file for complete search history.

(56) References Cited

U.S. PATENT DOCUMENTS

2010/0261569 A1* 10/2010 Ishikawa .............. B60K 17/165 74/665 F

FOREIGN PATENT DOCUMENTS

| | | | | |
|---|---|---|---|---|
| CN | 103863108 B | * 11/2017 | B60K 23/0808 |
| JP | 3804383 B2 | * 8/2006 | B60K 6/46 |
| JP | 2008-095711 A | 4/2008 | |
| JP | 2014-055663 A | 3/2014 | |
| JP | 2014-105826 A | 6/2014 | |
| JP | 2016-034812 A | 3/2016 | |
| JP | 2018-003862 A | 1/2018 | |
| JP | 2022-187959 A | 12/2022 | |
| KR | 10-2022-0165554 A | 12/2022 | |

* cited by examiner

*Primary Examiner* — Justin Holmes

(74) *Attorney, Agent, or Firm* — Bridgeway IP Law Group, PLLC; Jihun Kim

(57) ABSTRACT

Proposed is a method of controlling a power connection device for a four-wheel drive vehicle, the method including allowing a clutch ring and a support ring, which constitute any one meshing structure selected from a first meshing structure, a second meshing structure, and a third meshing structure, to mesh with each other by operating an actuator after determining a traveling situation and rotational speeds of left and right driving wheels.

18 Claims, 11 Drawing Sheets

METHOD OF CONTROLLING POWER CONNECTION DEVICE FOR FOUR-WHEEL DRIVE VEHICLE

CROSS-REFERENCE TO RELATED APPLICATIONS

This application claims priority to and the benefit of Korean Patent Application No. 10-2024-0027235 filed in the Korean Intellectual Property Office on Feb. 26, 2024, the entire contents of which are incorporated herein by reference.

TECHNICAL FIELD

The present invention relates to a method of controlling a power connection device for a four-wheel drive vehicle, such as a clutch ring and a support ring mounted in a disconnector apparatus.

BACKGROUND ART

In general, a disconnector apparatus may include a differential casing, a support ring mounted in a differential casing, a pinion gear mounted in a support ring, left and right side gears configured to mesh with the pinion gear, and a clutch ring configured to mesh with the support ring.

A sleeve connected to an actuator may be moved in a meshing direction by an operation of the actuator. When the sleeve moves in the meshing direction, the clutch ring connected to the sleeve moves toward the support ring, such that a meshing (interlocking) state may be implemented in which teeth of the clutch ring engage with teeth of the support ring. Therefore, four-wheel drive (4WD) may be implemented.

On the contrary, the sleeve may be moved in a meshing release direction by the operation of the actuator. When the sleeve moves in the meshing release direction, the clutch ring connected to the sleeve is separated from the support ring, such that the meshing state between the clutch ring and the support ring may be released. Therefore, two-wheel drive (2WD) may be implemented.

In the related art, because tips of the teeth of the clutch ring and the support ring of the disconnector apparatus each have a flat surface structure, there is a problem in that an impact occurs as the teeth of the clutch ring and the teeth of the support ring collide with each other when the clutch ring and the support ring mesh with each other, and a large amount of meshing time is required. In order to solve this problem, the tips of the teeth of the clutch ring and the support ring are each formed to have an inclined surface.

However, because of angles of the inclined surfaces of the tips of the teeth of the clutch ring and the support ring when the clutch ring and the support ring mesh with each other, the meshing is not implemented smoothly, which causes baulking.

DOCUMENT OF RELATED ART

Patent Document (Patent Document 1) Korean Patent Application Laid-Open No. 10-2022-0165554 (published on Dec. 15, 2022)

SUMMARY OF THE INVENTION

The present invention has been made in an effort to solve the above-mentioned problem, and an object of the present invention is to provide a method of controlling a power connection device for a four-wheel drive vehicle, which is capable of allowing power connection devices, such as a clutch ring and a support ring, which each are configured such that at least one side of a tooth tip has an inclined surface, to smoothly mesh with each other by moving the clutch ring in a meshing direction by an operation of an actuator.

In order to achieve the above-mentioned object, the present invention provides a method of controlling a power connection device for a four-wheel drive vehicle, the method including allowing a clutch ring and a support ring, which constitute any one meshing structure selected from a first meshing structure, a second meshing structure, and a third meshing structure, to mesh with each other by operating an actuator after determining a traveling situation and rotational speeds of left and right driving wheels.

In addition, controlling the clutch ring and the support ring, which constitute the first meshing structure, may include: (a) determining which driving wheel has a higher rotational speed (rpm) between the left and right driving wheels in a forward traveling situation and performing speed synchronization so that the clutch ring and the support ring mesh with each other; and (b) allowing teeth of the clutch ring and teeth of the support ring to mesh with one another by moving the clutch ring, which is connected to the actuator, in a meshing direction by operating the actuator.

In addition, an inclined contact surface may be provided at one side of a tip of the tooth of the clutch ring, a counterpart inclined contact surface may be provided at one side of a tip of the tooth of the support ring and configured to come into contact with the inclined contact surface, and the inclined contact surface may slide in a state in which the inclined contact surface is in contact with the counterpart inclined contact surface when the clutch ring and the support ring mesh with each other, such that the clutch ring and the support ring mesh with each other.

In addition, the inclined contact surface of the clutch ring may define an acute angle with respect to a tip end of the tooth of the clutch ring, and the counterpart inclined contact surface of the support ring may define an acute angle with respect to a tip end of the tooth of the support ring.

In addition, controlling the clutch ring and the support ring, which constitute the first meshing structure, may include: (a) determining which driving wheel has a higher rotational speed (rpm) between the left and right driving wheels in a rearward traveling situation and performing speed synchronization so that the clutch ring and the support ring mesh with each other; and (b) allowing teeth of the clutch ring and teeth of the support ring to mesh with one another by moving the clutch ring, which is connected to the actuator, in a meshing direction by operating the actuator.

In addition, an inclined contact surface may be provided at one side of a tip of the tooth of the clutch ring, a counterpart inclined contact surface may be provided at one side of a tip of the tooth of the support ring and configured to come into contact with the inclined contact surface, and the inclined contact surface may slide in a state in which the inclined contact surface is in contact with the counterpart inclined contact surface when the clutch ring and the support ring mesh with each other, such that the clutch ring and the support ring mesh with each other.

In addition, the inclined contact surface of the clutch ring may define an acute angle with respect to a tip end of the tooth of the clutch ring, and the counterpart inclined contact surface of the support ring may define an acute angle with respect to a tip end of the tooth of the support ring.

In addition, controlling the clutch ring and the support ring, which constitute the second meshing structure, may include: (a) determining which driving wheel has a higher rotational speed (rpm) between the left and right driving wheels in forward and rearward traveling situations and performing speed synchronization so that the clutch ring and the support ring mesh with each other; and (b) allowing teeth of the clutch ring and teeth of the support ring to mesh with one another by moving the clutch ring, which is connected to the actuator, in a meshing direction by operating the actuator.

In addition, an inclined contact surface may be provided at one side of a tip of the tooth of the clutch ring, a tip end of the tooth of the clutch ring, which excludes the inclined contact surface, may be configured as a flat surface, and the inclined contact surface may define an obtuse angle of the tip end of the tooth of the clutch ring.

In addition, a counterpart inclined contact surface may be provided at one side of a tip of the tooth of the support ring opposite to the inclined contact surface, a tip end of the tooth of the support ring, which excludes the counterpart inclined contact surface, may be configured as a flat surface, and the counterpart inclined contact surface may define an obtuse angle with respect to the tip end of the tooth of the support ring.

In addition, controlling the clutch ring and the support ring, which constitute the third meshing structure, may include: (a) determining which driving wheel has a higher rotational speed (rpm) between the left and right driving wheels in forward and rearward traveling situations and performing speed synchronization so that the clutch ring and the support ring mesh with each other; and (b) allowing teeth of the clutch ring and teeth of the support ring to mesh with one another by moving the clutch ring, which is connected to the actuator, in a meshing direction by operating the actuator.

In addition, inclined contact surfaces may be provided at two opposite sides of a tip of the tooth of the clutch ring.

In addition, counterpart inclined contact surfaces may be provided at two opposite sides of a tip of the tooth of the support ring opposite to the inclined contact surfaces provided at the two opposite sides.

In addition, a tip end of the tooth of the clutch ring, which is positioned between the inclined contact surfaces provided at the two opposite sides, may be configured as a flat surface, and the inclined contact surface may define an obtuse angle with respect to the tip end of the tooth of the clutch ring.

In addition, a tip end of the tooth of the support ring, which is provided between the counterpart inclined contact surfaces provided at the two opposite sides, may be configured as a flat surface, and the counterpart inclined contact surface may define an obtuse angle with respect to the tip end of the tooth of the support ring.

In addition, rotational speeds of the left and right driving wheels may be acquired from wheel sensors mounted in the left and right driving wheels or a motor sensor mounted in a drive motor configured to transmit power to the left and right driving wheels.

In addition, the clutch ring may be allowed to mesh with the support ring by operating the actuator after the speed synchronization is performed by different preset logics in accordance with different conditions such as a forward movement, a rearward movement, preset rapid deceleration, and preset rapid acceleration of the vehicle, and the speed synchronization may be performed while the vehicle travels under a differential condition in which a rotational speed (rpm) of the left driving wheel is higher than a rotational speed (rpm) of the right driving wheel or a rotational speed (rpm) of the right driving wheel is higher than a rotational speed (rpm) of the left driving wheel.

In addition, the teeth of the clutch ring may be formed along an inner-diameter portion directed toward the support ring, and the teeth of the support ring may be formed along an outer-diameter portion directed toward the clutch ring.

In addition, the clutch ring and the support ring may be mounted in a casing of a disconnector apparatus, and the clutch ring may mesh with the support ring while being moved toward the support ring by a sleeve moved by the operation of the actuator.

According to the present invention, it is possible to allow the power connection devices, such as the clutch ring and the support ring, which each are configured such that at least one side of the tooth tip has the inclined surface, to smoothly mesh with each other by moving the clutch ring in the meshing direction by the operation of the actuator.

In addition, according to the present invention, at least one inclined contact surface and at least one counterpart inclined contact surface are formed at the tips of the teeth of the clutch ring and the support ring, such that the clutch ring and the support ring may smoothly mesh with each other.

In addition, according to the present invention, it is possible to solve the problem in the related art in that because the tips of the teeth of the clutch ring and the support ring each have a flat surface structure, an impact occurs as the teeth of the clutch ring and the teeth of the support ring collide with each other when the clutch ring and the support ring mesh with each other, and a large amount of time is required for the clutch ring and the support ring to mesh with each other.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
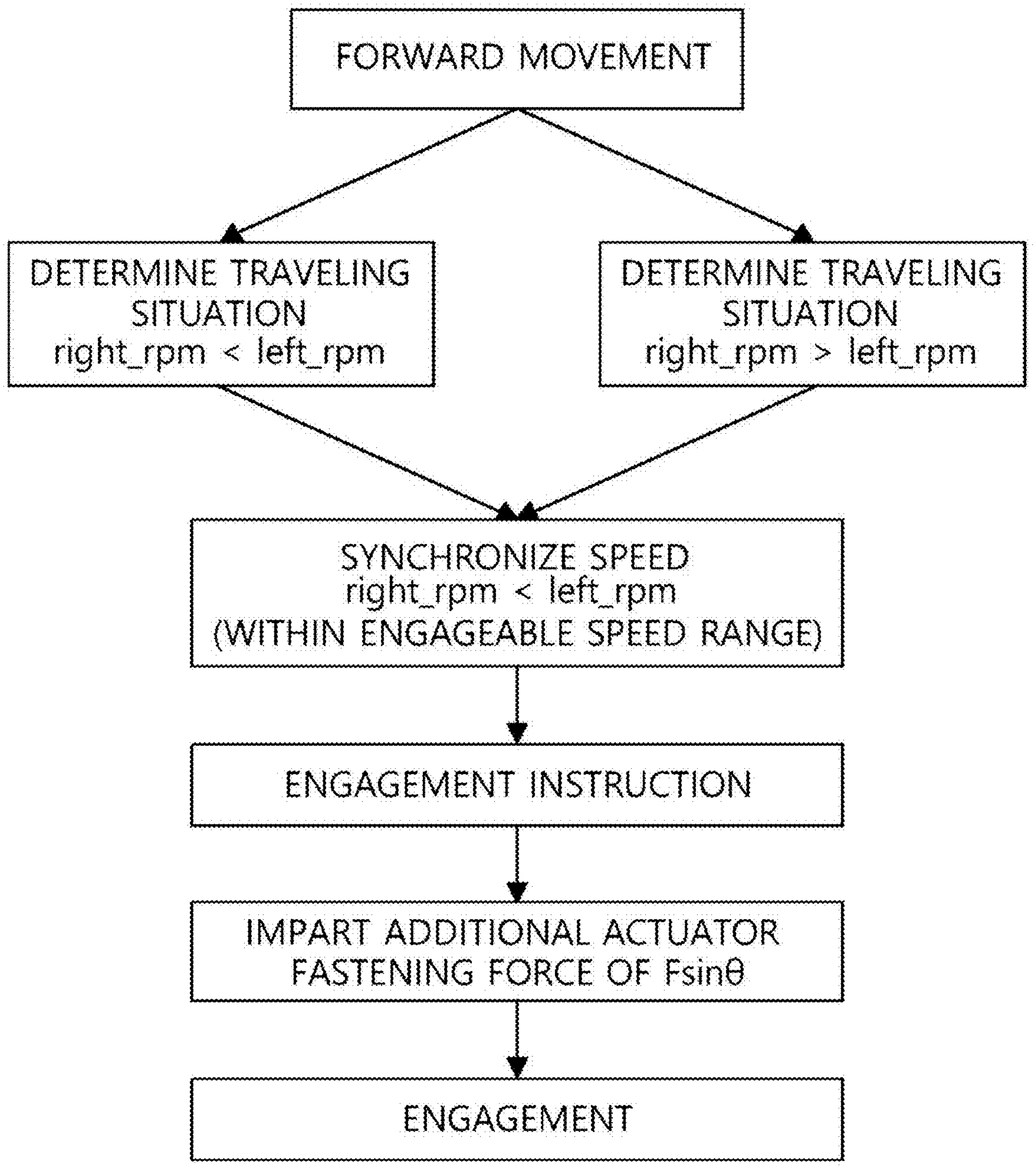
FIG. 1 is a flowchart illustrating a process in which a clutch ring and a support ring, which constitute a first meshing structure, mesh with each other in a forward traveling situation according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

A method of controlling a power connection device for a four-wheel drive vehicle according to the present invention may allow a clutch ring and a support ring, which constitute any one meshing structure selected from a first meshing structure, a second meshing structure, and a third meshing structure, to mesh with each other by operating an actuator after determining a traveling situation and rotational speeds of left and right driving wheels.

Figure 5:
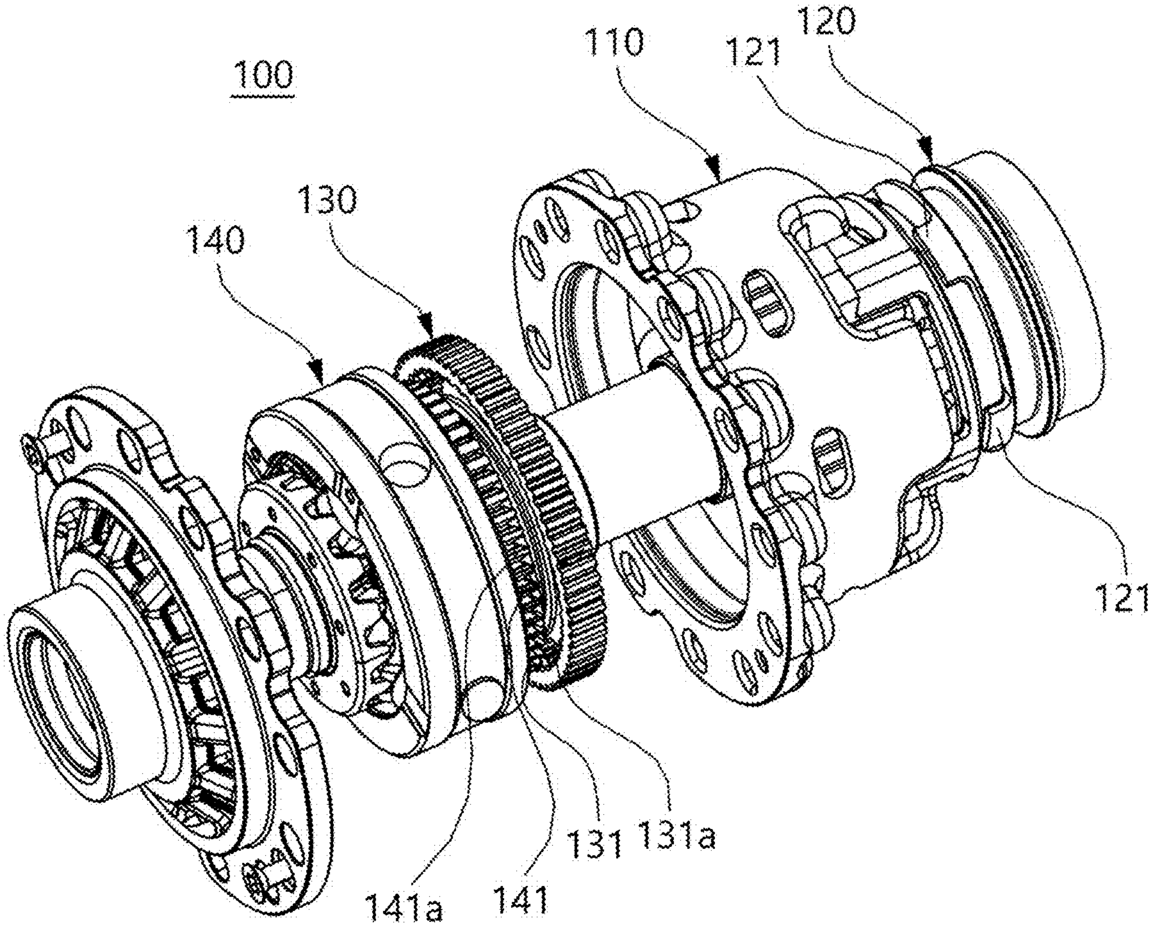
FIG. 5 is a view illustrating the clutch ring and the support ring mounted in a disconnector apparatus according to the present invention.
Figure 6:
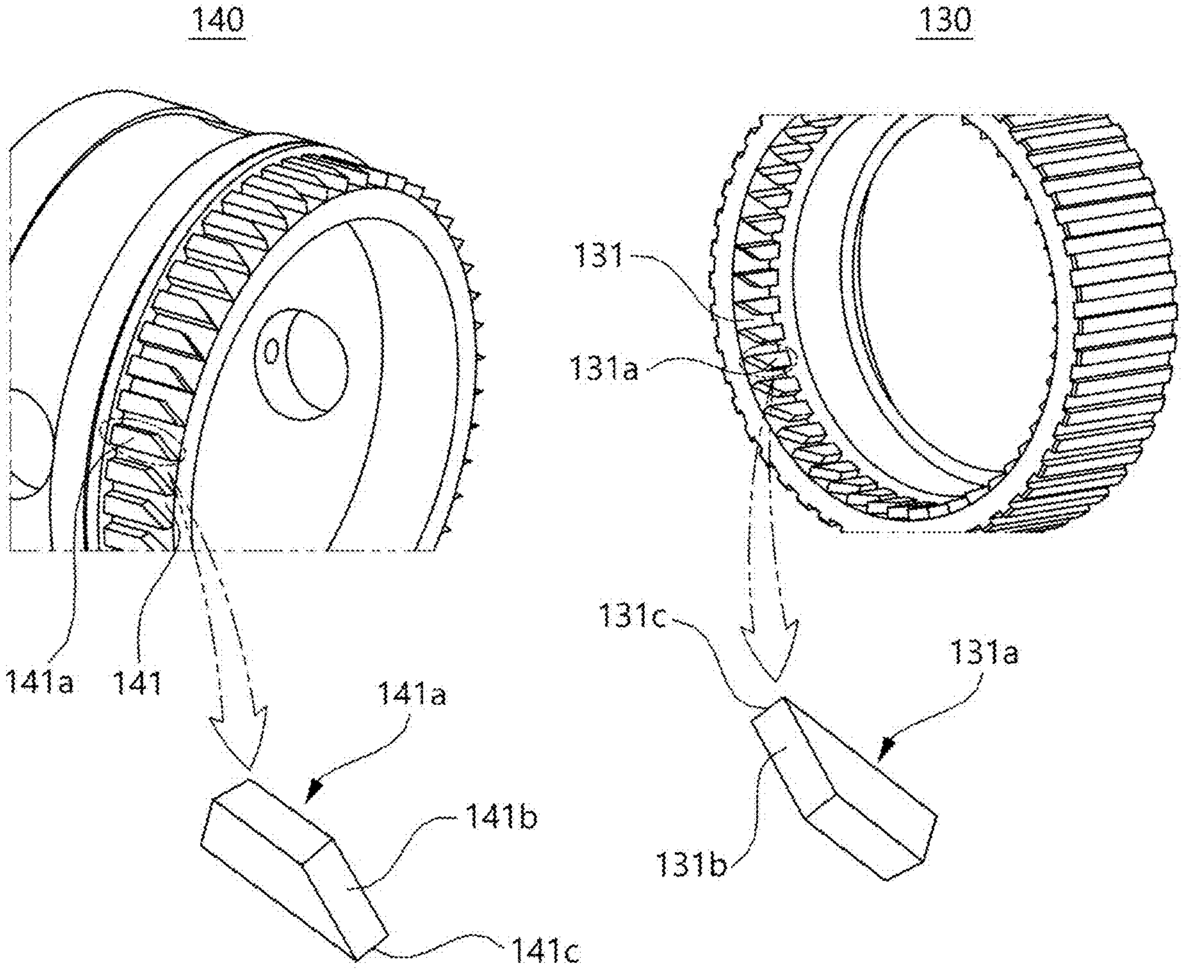
FIG. 6 is an enlarged view illustrating the clutch ring and the support ring that constitute the first meshing structure according to the present invention.
Figure 7:
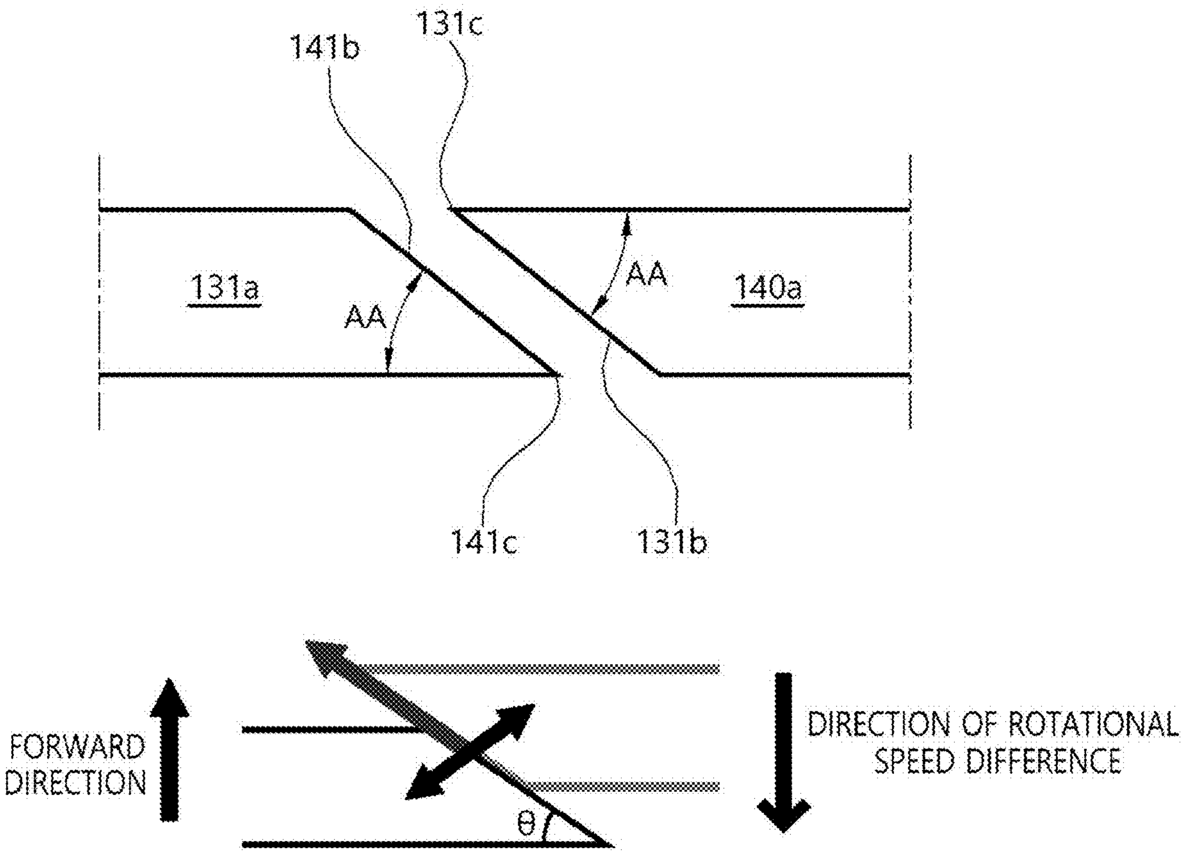
FIG. 7 is a view schematically illustrating a tooth of the clutch ring and a tooth of the support ring in FIG. 6.

FIG. 1 is a flowchart illustrating a process in which a clutch ring and a support ring, which constitute a first meshing structure, mesh with each other in a forward traveling situation according to the present invention, FIG. 5 is a view illustrating the clutch ring and the support ring mounted in a disconnector apparatus according to the present invention, FIG. 6 is an enlarged view illustrating the clutch ring and the support ring that constitute the first meshing structure according to the present invention, and FIG. 7 is a view schematically illustrating a tooth of the clutch ring and a tooth of the support ring in FIG. 6.

As illustrated in FIGS. 1 and 5 to 7, the method may include a speed synchronization step of synchronizing speeds of a clutch ring 130 and a support ring 140, which constitute the first meshing structure, in a forward traveling situation, and a meshing step of allowing the clutch ring 130 to mesh with the support ring 140 by operating an actuator (not illustrated).

In the speed synchronization step, which driving wheel has a higher rotational speed (rpm) between left and right driving wheels (not illustrated) may be determined, and speed synchronization may be performed so that the clutch ring 130 and the support ring 140 may mesh with each other.

In case that a difference in rotational speed (rpm) between the left and right driving wheels (not illustrated) is within a preset speed difference range, the actuator (not illustrated) may be operated.

In the meshing step, the actuator (not illustrated) may operate to move the clutch ring 130, which is connected to the actuator (not illustrated), in a meshing direction, such that the clutch ring 130 and the support ring 140 may mesh with each other.

When the vehicle turns or travels on an uneven road surface, a differential motion may occur in which a rotational speed (rpm) of the right driving wheel is higher than a rotational speed (rpm) of the left driving wheel, or a rotational speed (rpm) of the left driving wheel is higher than a rotational speed (rpm) of the right driving wheel.

In case that a speed difference between the left and right driving wheels (not illustrated) is within a preset speed difference range, the clutch ring 130 connected to the actuator (not illustrated) may be moved in the meshing direction by the operation of the actuator (not illustrated). The actuator (not illustrated) and the clutch ring 130 may be connected by a sleeve 120.

During the meshing operation of the clutch ring 130, the clutch ring 130 may mesh with the support ring 140 as teeth 131*a* of the clutch ring 130 are inserted between teeth 141*a* of the support ring 140.

An inclined contact surface 131*b* may be provided at one side of a tip of the tooth 131*a* of the clutch ring 130. A counterpart inclined contact surface 141*b* may be provided at one side of a tip of the tooth 141*a* of the support ring 140.

The counterpart inclined contact surface 141*b* of the support ring 140 and the inclined contact surface 131*b* of the clutch ring 130 may come into contact with each other during the meshing process.

Data related to the difference in rotational speed between the left and right driving wheels (not illustrated) may be acquired from wheel sensors (not illustrated) mounted in the left and right driving wheels (not illustrated) or a motor sensor (not illustrated) mounted in a drive motor (not illustrated) configured to transmit power to the left and right driving wheels (not illustrated).

The speed synchronization may be performed by different preset logics in accordance with different conditions such as a forward movement, a rearward movement, preset rapid deceleration, and preset rapid acceleration of the vehicle. After the speed synchronization, the actuator (not illustrated) may operate to allow the clutch ring 130 and the support ring 140 to mesh with each other.

The speed synchronization may be performed while the vehicle travels under the differential condition in which the rotational speed (rpm) of the left driving wheel is higher than the rotational speed (rpm) of the right driving wheel or the rotational speed (rpm) of the right driving wheel is higher than the rotational speed (rpm) of the left driving wheel.

In case that the clutch ring 130 does not mesh with the support ring 140 within a predetermined time, the clutch ring 130 may be pressed toward the support ring 140 by preset driving power higher than initial driving power of the actuator (not illustrated), such that the clutch ring 130 may mesh with the support ring 140.

Figure 2:
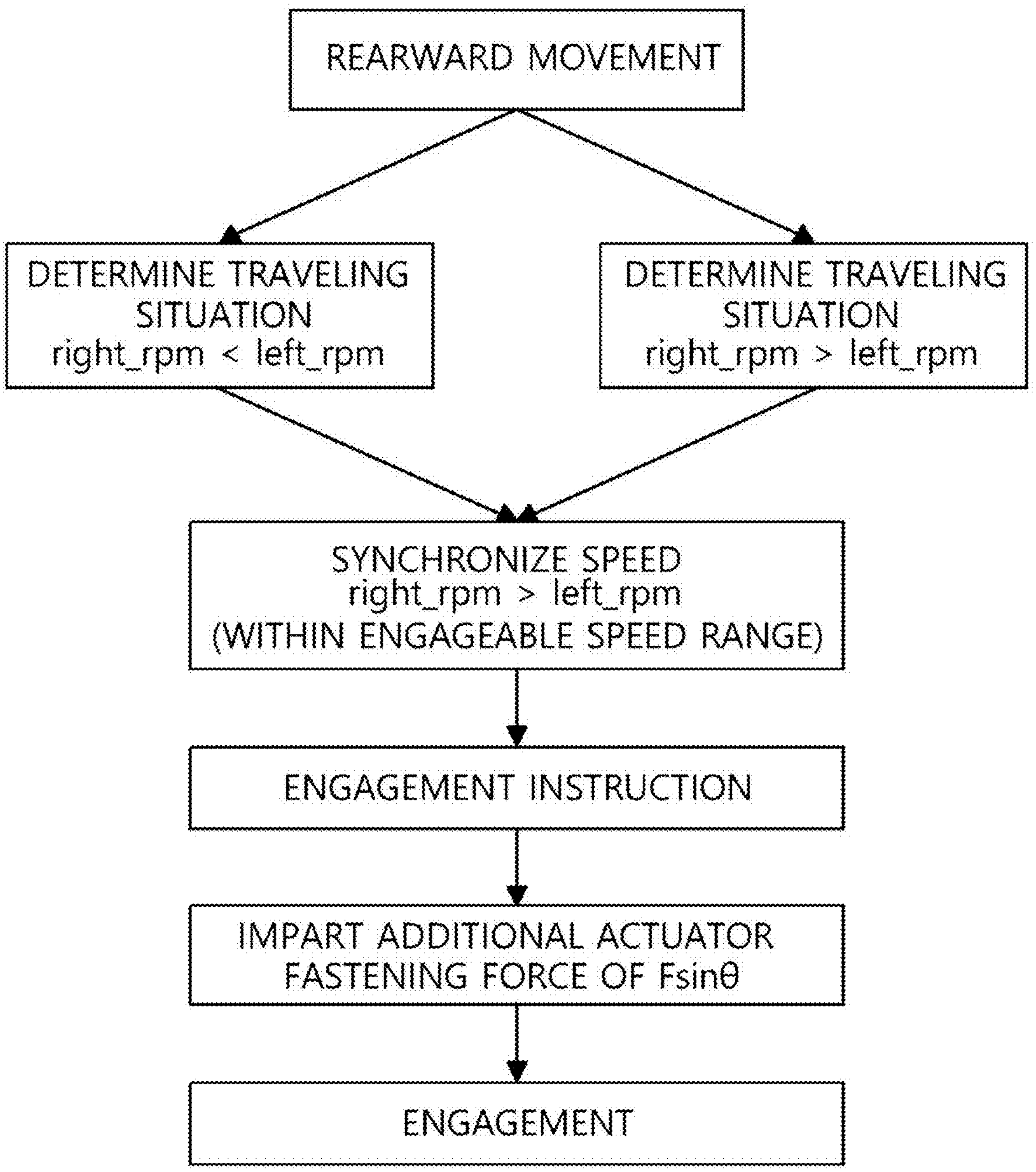
FIG. 2 is a flowchart illustrating a process in which the clutch ring and the support ring, which constitute the first meshing structure, mesh with each other in a rearward traveling situation according to the present invention.

FIG. 2 is a flowchart illustrating a process in which the clutch ring and the support ring, which constitute the first meshing structure, mesh with each other in the rearward traveling situation according to the present invention.

As illustrated in FIGS. 2 and 5 to 7, the method related to the clutch ring 130 and the support ring 140, which constitute the first meshing structure, may include a step of determining which driving wheel has a higher rotational speed (rpm) between the left and right driving wheels (not illustrated) in the rearward traveling situation and synchronizing the speeds of the left and right driving wheels (not illustrated) so that the clutch ring 130 and the support ring 140 may mesh with each other, and a step of allowing the teeth 131*a* of the clutch ring 130 and the teeth 141*a* of the support ring 140 to mesh with one another by moving the clutch ring 130, which is connected to the actuator (not illustrated), in the meshing direction by operating the actuator (not illustrated).

As illustrated in FIG. 5, a disconnector apparatus 100 may include a casing 110, the support ring 140 mounted in the casing 110, a pinion gear (not illustrated) mounted in the support ring 140, left and right side gears (not illustrated) configured to mesh with the pinion gear (not illustrated), and the clutch ring 130 configured to mesh with the support ring 140.

When the actuator (not illustrated) operates, the sleeve 120 connected to the actuator (not illustrated) may move toward the support ring 140.

The clutch ring 130 connected to the sleeve 120 may be moved toward the support ring 140 by the movement of the sleeve 120. A connection portion 121, which is connected to the clutch ring 130, may be provided on a surface of the sleeve 120 directed toward the clutch ring 130. The connection portion 121 may be provided as a plurality of connection portions 121.

The clutch ring 130 may move toward the support ring 140 and mesh with the support ring 140.

The sleeve 120 connected to the actuator (not illustrated) may be moved in the meshing direction by the operation of the actuator (not illustrated). When the sleeve 120 moves in the meshing direction, the clutch ring 130 connected to the sleeve 120 moves toward the support ring 140, such that a meshing (interlocking) state may be implemented in which the teeth 131*a* of the clutch ring 130 engage with the teeth 141*a* of the support ring 140. Therefore, four-wheel drive (4WD) may be implemented.

On the contrary, the sleeve 120 may be moved in a meshing release direction by the operation of the actuator (not illustrated). When the sleeve 120 moves in the meshing release direction, the clutch ring 130 connected to the sleeve 120 is separated from the support ring 140, such that the meshing state between the clutch ring 130 and the support ring 140 may be released. Therefore, two-wheel drive (2WD) may be implemented.

As illustrated in FIGS. 6 and 7, the teeth 131*a* of the clutch ring 130 may be formed along an inner-diameter portion 131 directed toward the support ring 140. The teeth 141*a* of the support ring 140 may be formed along an outer-diameter portion 141 directed toward the clutch ring 130. When the clutch ring 130 and the support ring 140 mesh with each other, the outer-diameter portion 141 of the support ring 140 may be inserted into the inner-diameter portion 131 of the clutch ring 130.

The inclined contact surface 131*b* of the clutch ring 130 may be configured as an inclined surface that defines an acute angle AA with respect to a tip end 131*c* of the tooth 131*a* of the clutch ring 130.

The counterpart inclined contact surface 141*b* may be provided at one side of the tip of the tooth 141*a* of the support ring 140 opposite to the inclined contact surface 131*b* of the clutch ring 130.

The counterpart inclined contact surface 141*b* of the support ring 140 may be configured as an inclined surface that defines the acute angle AA with respect to a tip end 141*c* of the tooth 141*a*.

When the clutch ring 130 and the support ring 140 mesh with each other, the clutch ring 130 moves toward the support ring 140, and the inclined contact surface 131*b* of the tooth 131*a* of the clutch ring 130 may come into contact with the counterpart inclined contact surface 141*b* of the support ring 140.

The teeth 131*a* of the clutch ring 130 may be easily inserted between the teeth 141*a* of the support ring 140 as the inclined contact surface 131*b* slides along the counterpart inclined contact surface 141*b* in a state in which the inclined contact surface 131*b* is in contact with the counterpart inclined contact surface 141*b* of the support ring 140. Therefore, the clutch ring 130 and the support ring 140 may smoothly mesh with each other.

Figure 3:
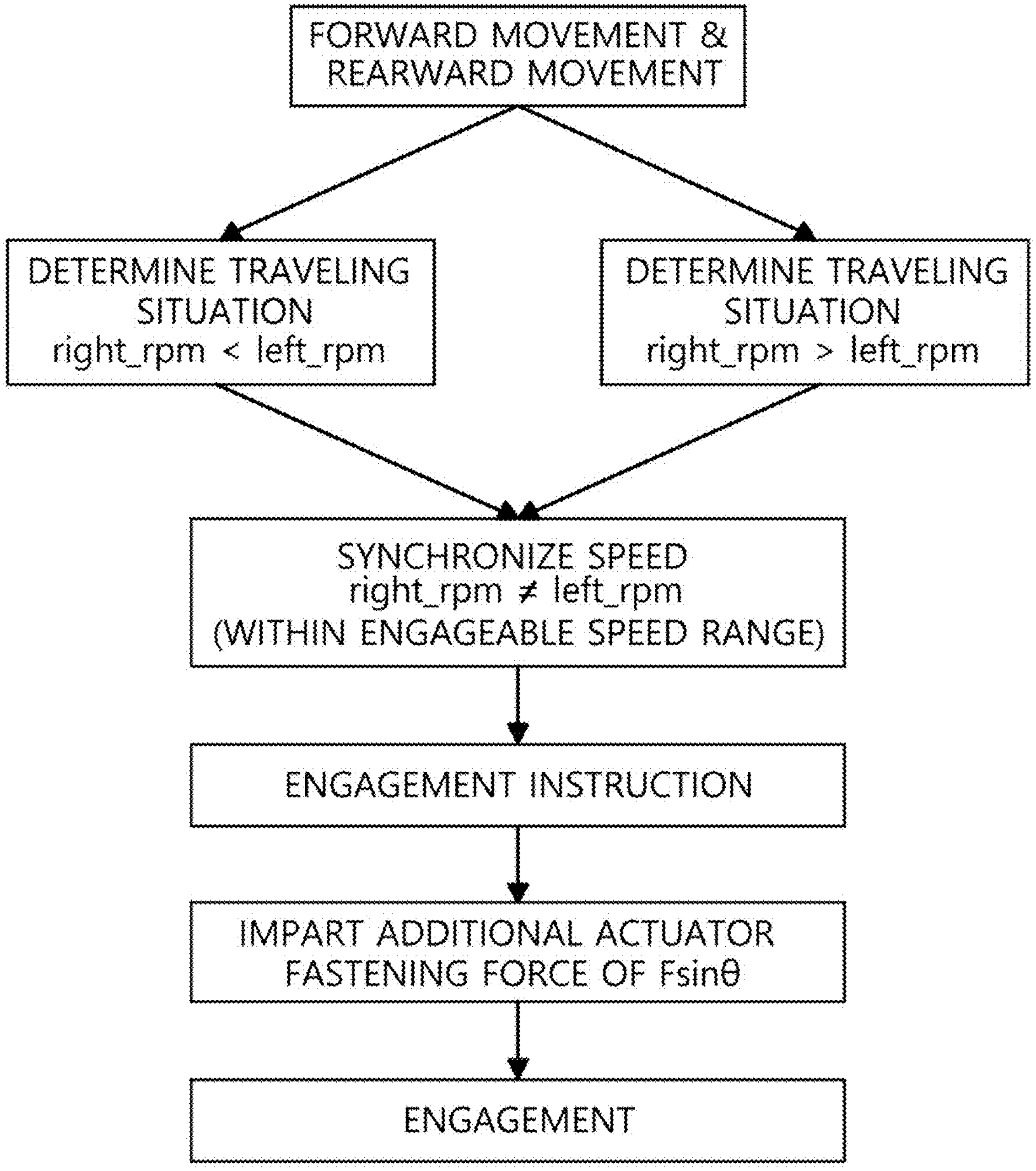
FIG. 3 is a flowchart illustrating a process in which the clutch ring and the support ring, which constitute a second meshing structure, mesh with each other in forward and rearward traveling situations according to the present invention.
Figure 8:
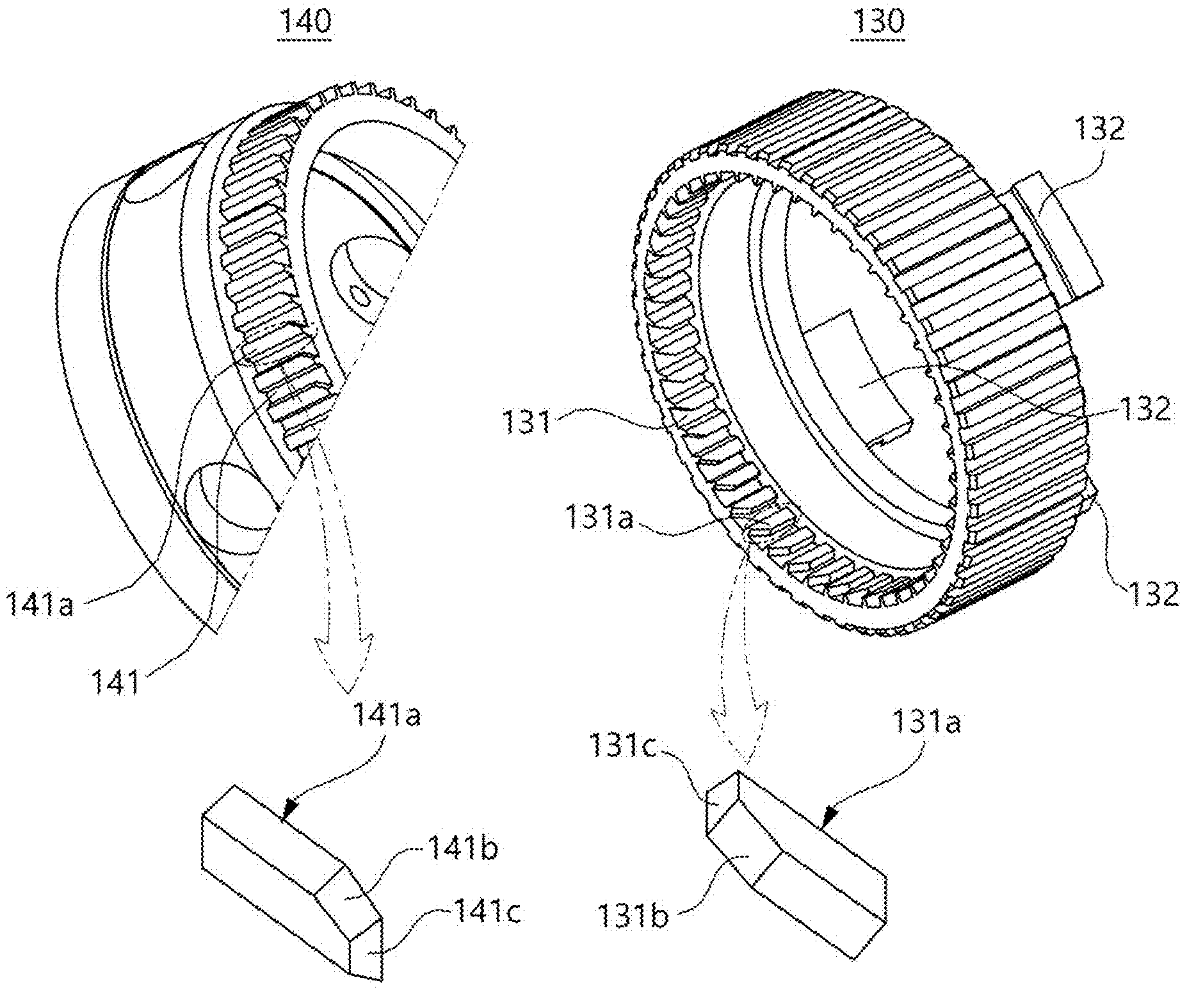
FIG. 8 is an enlarged view illustrating the clutch ring and the support ring that constitute the second meshing structure according to the present invention.
Figure 9:
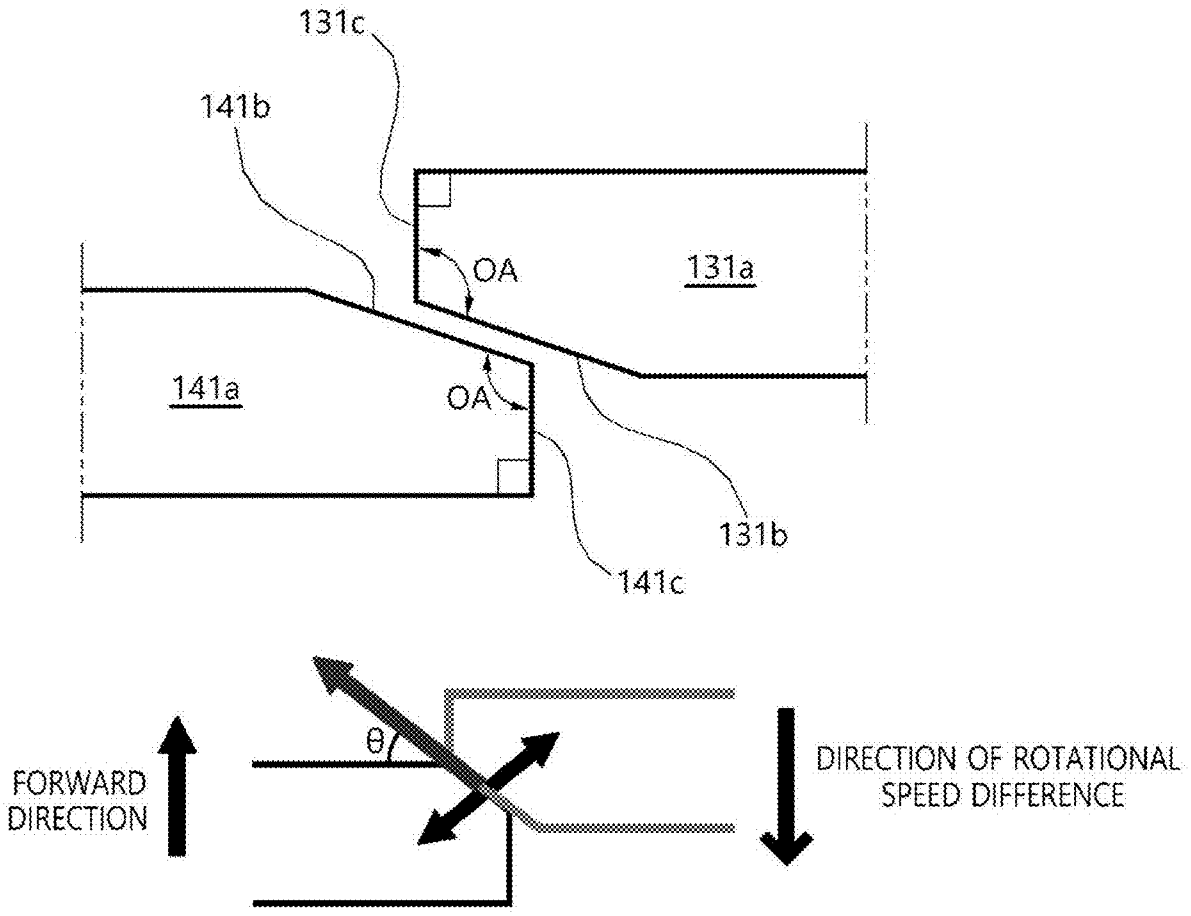
FIG. 9 is a view schematically illustrating a tooth of the clutch ring and a tooth of the support ring in FIG. 8.

FIG. 3 is a flowchart illustrating a process in which the clutch ring and the support ring, which constitute the second meshing structure, mesh with each other in the forward and rearward traveling situations according to the present invention, FIG. 8 is an enlarged view illustrating the clutch ring and the support ring that constitute the second meshing structure according to the present invention, and FIG. 9 is a view schematically illustrating the tooth of the clutch ring and the tooth of the support ring in FIG. 8.

As illustrated in FIGS. 3, 8, and 9, the method related to the clutch ring 130 and the support ring 140, which constitute the second meshing structure, may include a step of determining which driving wheel has a higher rotational speed (rpm) between the left and right driving wheels (not illustrated) in the forward and rearward traveling situations and synchronizing the speeds of the left and right driving wheels (not illustrated) so that the clutch ring 130 and the support ring 140 may mesh with each other, and a step of allowing the teeth 131*a* of the clutch ring 130 and the teeth 141*a* of the support ring 140 to mesh with one another other by moving the clutch ring 130, which is connected to the actuator (not illustrated), in the meshing direction by operating the actuator (not illustrated).

As illustrated in FIGS. 8 and 9, the teeth 131*a* of the clutch ring 130 may be formed along the inner-diameter portion 131 directed toward the support ring 140. The teeth 141*a* of the support ring 140 may be formed along the outer-diameter portion 141 directed toward the clutch ring 130. When the clutch ring 130 and the support ring 140 mesh with each other, the outer-diameter portion 141 of the support ring 140 may be inserted into the inner-diameter portion 131 of the clutch ring 130.

The inclined contact surface 131*b* may be provided at one side of the tip of the tooth 131*a* of the clutch ring 130.

The tip end 131*c* of the tooth 131*a* of the clutch ring 130, which excludes the inclined contact surface 131*b*, may be configured as a flat surface.

The tip end 131*c* of the tooth 131*a* of the clutch ring 130, which is configured as a flat surface, and a side surface of the adjacent tooth 131*a* of the clutch ring 130 may define a right angle.

The inclined contact surface 131*b* may be configured as an inclined surface that defines an obtuse angle OA with respect to the tip end 131*c* of the tooth 131*a* of the clutch ring 130.

The counterpart inclined contact surface 141*b* may be provided at one side of the tip of the tooth 141*a* of the support ring 140 opposite to the inclined contact surface 131*b*.

The tip end 141*c* of the tooth 141*a* of the support ring 140, which excludes the counterpart inclined contact surface 141*b*, may be configured as a flat surface.

The counterpart inclined contact surface 141*b* may be configured as an inclined surface that defines the obtuse angle OA with respect to the tip end 141*c* of the tooth 141*a* of the support ring 140.

When the clutch ring 130 and the support ring 140 mesh with each other, the clutch ring 130 moves toward the support ring 140, and the inclined contact surface 131*b* of the tooth 131*a* of the clutch ring 130 may come into contact with the counterpart inclined contact surface 141*b* of the support ring 140.

The teeth 131*a* of the clutch ring 130 may be easily inserted between the teeth 141*a* of the support ring 140 as the inclined contact surface 131*b* slides along the counterpart inclined contact surface 141*b* in a state in which the inclined contact surface 131*b* is in contact with the counterpart inclined contact surface 141*b* of the support ring 140. Therefore, the clutch ring 130 and the support ring 140 may smoothly mesh with each other.

Meanwhile, an extension portion 132, which is connected to the sleeve 120, may be provided on a surface of the clutch ring 130 directed toward the sleeve 120. The extension portion 132 may be provided as a plurality of extension portions 132. The extension portion 132 may be connected to the connection portion 121 of the sleeve 120.

Figure 4:
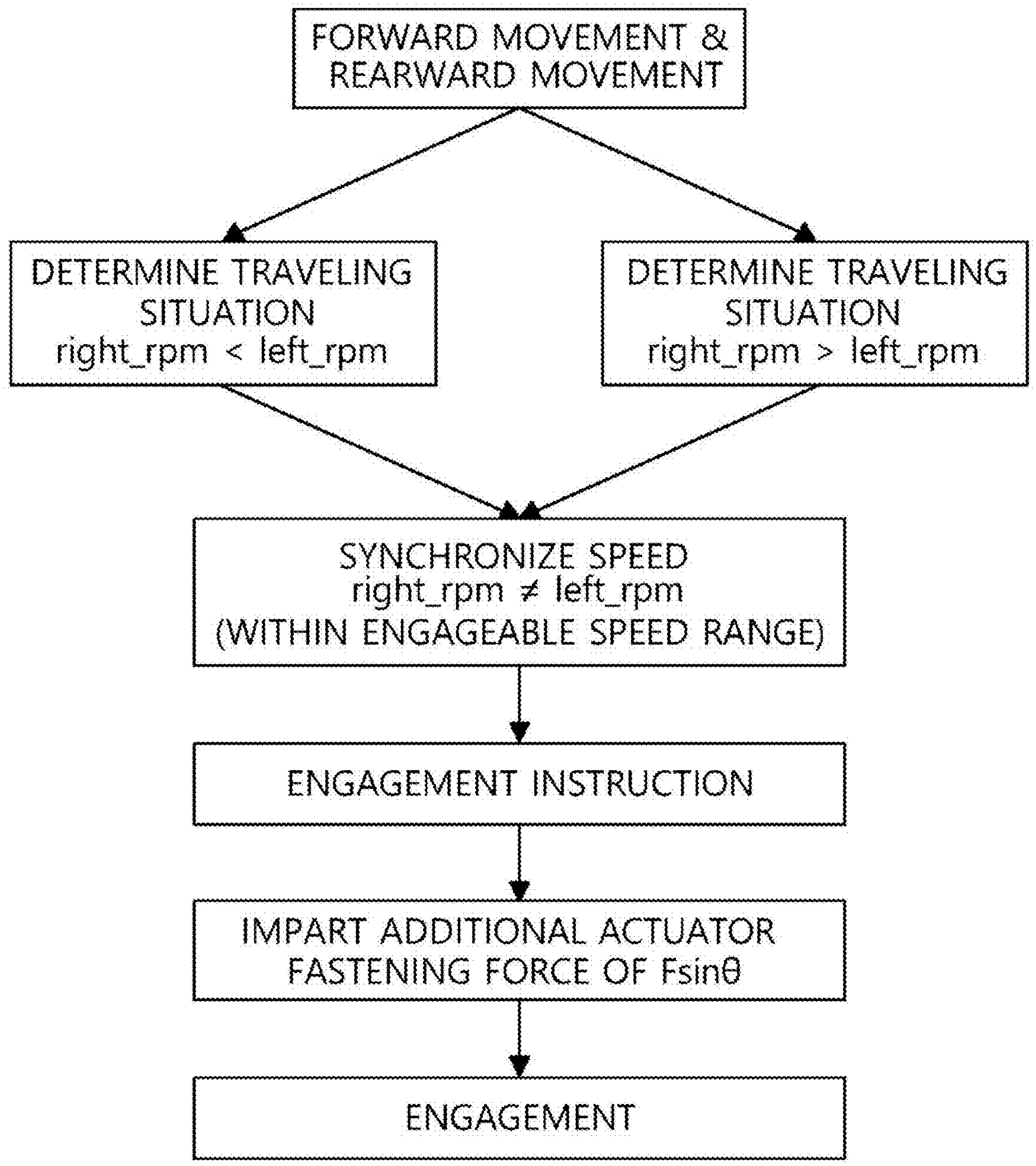
FIG. 4 is a flowchart illustrating a process in which the clutch ring and the support ring, which constitute a third meshing structure, mesh with each other in the forward and rearward traveling situations according to the present invention.
Figure 10:
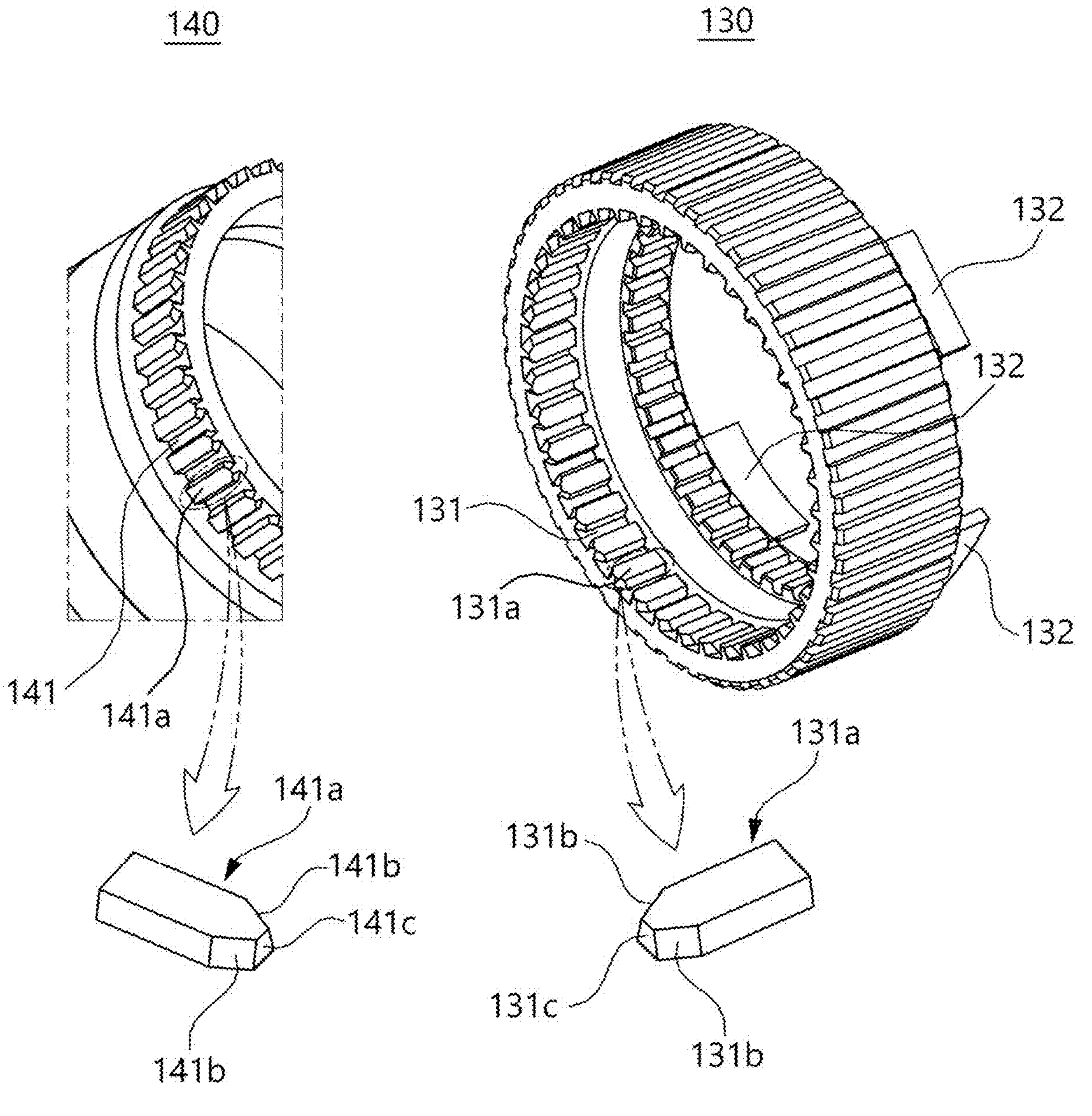
FIG. 10 is an enlarged view illustrating the clutch ring and the support ring that constitute the third meshing structure according to the present invention.
Figure 11:
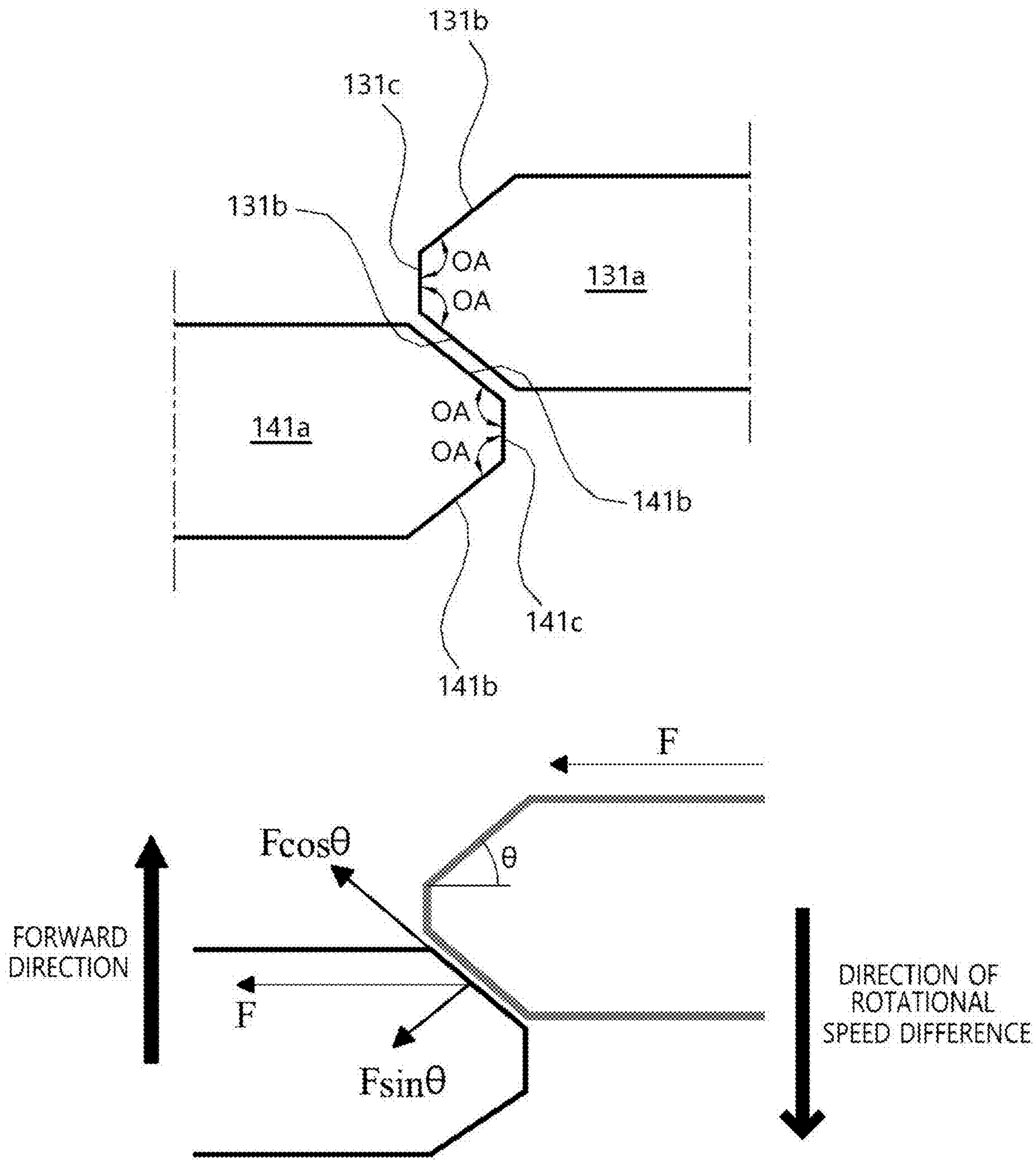
FIG. 11 is a view schematically illustrating a tooth of the clutch ring and a tooth of the support ring in FIG. 10.

FIG. 4 is a flowchart illustrating a process in which the clutch ring and the support ring, which constitute the third meshing structure, mesh with each other in the forward and rearward traveling situations according to the present invention, FIG. 10 is an enlarged view illustrating the clutch ring and the support ring that constitute the third meshing structure according to the present invention, and FIG. 11 is a view schematically illustrating the tooth of the clutch ring and the tooth of the support ring in FIG. 10.

As illustrated in FIGS. 4, 10, and 11, the method related to the clutch ring 130 and the support ring 140, which constitute the third meshing structure, may include a step of determining which driving wheel has a higher rotational speed (rpm) between the left and right driving wheels (not illustrated) in the forward and rearward traveling situations and synchronizing the speeds of the left and right driving wheels (not illustrated) so that the clutch ring 130 and the support ring 140 may mesh with each other, and a step of allowing the teeth 131*a* of the clutch ring 130 and the teeth 141*a* of the support ring 140 to mesh with one another by moving the clutch ring 130, which is connected to the actuator (not illustrated), in the meshing direction by operating the actuator (not illustrated).

As illustrated in FIGS. 10 and 11, the teeth 131*a* of the clutch ring 130 may be formed along the inner-diameter portion 131 directed toward the support ring 140. The teeth 141*a* of the support ring 140 may be formed along the outer-diameter portion 141 directed toward the clutch ring 130. When the clutch ring 130 and the support ring 140 mesh with each other, the outer-diameter portion 141 of the support ring 140 may be inserted into the inner-diameter portion 131 of the clutch ring 130.

The inclined contact surfaces 131*b* may be provided at two opposite sides of the tip of the tooth 131*a* of the clutch ring 130.

The counterpart inclined contact surfaces 141*b* may be provided at two opposite sides of the tip of the tooth 141*a* of the support ring 140 opposite to the inclined contact surfaces 131*b* provided at the two opposite sides.

The tip end 131*c* of the tooth 131*a* of the clutch ring 130, which is positioned between the inclined contact surfaces 131*b* provided at two opposite sides, may be configured as a flat surface.

The inclined contact surface 131*b* may be configured as an inclined surface that defines an obtuse angle OA with respect to the tip end 141*c* of the tooth 131*a* of the clutch ring 130 that is configured as a flat surface.

The tip end 141*c* of the tooth 141*a* of the support ring 140, which is provided between the counterpart inclined contact surfaces 141*b* provided at two opposite sides, may be configured as a flat surface.

The counterpart inclined contact surface 141*b* may define the obtuse angle OA with respect to the tip end 141*c* of the tooth 141*a* of the support ring 140.

When the clutch ring 130 and the support ring 140 mesh with each other, the clutch ring 130 moves toward the support ring 140, and one of the two inclined contact surfaces 131*b* of the tooth 131*a* of the clutch ring 130 may come into contact with the counterpart inclined contact surface 141*b* of the opposing support ring 140.

The teeth 131*a* of the clutch ring 130 may be easily inserted between the teeth 141*a* of the support ring 140 as the inclined contact surface 131*b* slides along the counterpart inclined contact surface 141*b* in a state in which the inclined contact surface 131*b* is in contact with the counterpart inclined contact surface 141*b* of the support ring 140. Therefore, the clutch ring 130 and the support ring 140 may smoothly mesh with each other.

Meanwhile, the extension portion 132, which is connected to the sleeve 120, may be provided on the surface of the clutch ring 130 directed toward the sleeve 120. The extension portion 132 may be provided as a plurality of extension portions 132. The extension portion 132 may be connected to the connection portion 121 of the sleeve 120.

As described above, according to the present invention, it is possible to allow the power connection devices, such as the clutch ring and the support ring, which each are configured such that at least one side of the tooth tip has the inclined surface, to smoothly mesh with each other by moving the clutch ring in the meshing direction by the operation of the actuator. In addition, according to the present invention, at least one inclined contact surface and at least one counterpart inclined contact surface are formed at the tips of the teeth of the clutch ring and the support ring, such that the clutch ring and the support ring may smoothly mesh with each other. In addition, according to the present invention, it is possible to solve the problem in the related art in that because the tips of the teeth of the clutch ring and the support ring each have a flat surface structure, an impact occurs as the teeth of the clutch ring and the teeth of the support ring collide with each other when the clutch ring and the support ring mesh with each other, and a large amount of time is required for the clutch ring and the support ring to mesh with each other.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of controlling a power connection device for a four-wheel drive vehicle, the method comprising controlling a clutch ring and a support ring to mesh with each other to constitute any one meshing structure selected from a first meshing structure, a second meshing structure, or a third meshing structure by operating an actuator after determining a driving situation and rotational speeds of left and right driving wheels, wherein the controlling the clutch ring and the support ring to constitute the first meshing structure comprises:

determining which driving wheel has a higher rotational speed between the left and right driving wheels in a forward driving situation and performing speed synchronization to mesh the clutch ring and the support ring with each other; and allowing teeth of the clutch ring to mesh with teeth of the support ring by moving the clutch ring, which is connected to the actuator, in a meshing direction by the operating of the actuator.

2. The method of claim 1, wherein an inclined contact surface is defined at one side of a tip of each of the teeth of the clutch ring, wherein a counterpart inclined contact surface is defined at one side of a tip of each of the teeth of the support ring and configured to come into contact with the inclined contact surface, and wherein the inclined contact surface is configured to slide in a state in which the inclined contact surface is in contact with the counterpart inclined contact surface, and the clutch ring and the support ring are configured to mesh with each other.

3. The method of claim 2, wherein the inclined contact surface of the clutch ring has an acute angle with respect to a tip end of each of the teeth of the clutch ring, and the counterpart inclined contact surface of the support ring has an acute angle with respect to a tip end of each of the teeth of the support ring.

4. The method of claim 1, wherein the rotational speeds of the left and right driving wheels are acquired from wheel sensors mounted in the left and right driving wheels or a motor sensor mounted in a drive motor configured to transmit power to the left and right driving wheels.

5. The method of claim 1, wherein teeth of the clutch ring are formed along an inner-diameter portion of the clutch ring directed toward the support ring, and the teeth of the support ring are formed along an outer-diameter portion of the support ring directed toward the clutch ring.

6. The method of claim 1, wherein the clutch ring and the support ring are mounted in a casing of a disconnector apparatus, and the clutch ring is configured to mesh with the support ring while being moved toward the support ring by a sleeve moved by the operating of the actuator.

7. A method of controlling a power connection device for a four-wheel drive vehicle, the method comprising controlling a clutch ring and a support ring to mesh with each other to constitute any one meshing structure selected from a first meshing structure, a second meshing structure, or a third meshing structure by operating an actuator after determining a driving situation and rotational speeds of left and right driving wheels, wherein the controlling the clutch ring and the support ring to constitute the first meshing structure comprises:

determining which driving wheel has a higher rotational speed between the left and right driving wheels in a rearward driving situation and performing speed synchronization to mesh the clutch ring and the support ring with each other; and allowing teeth of the clutch ring to mesh with teeth of the support ring by moving the clutch ring, which is connected to the actuator, in a meshing direction by the operating of the actuator.

8. The method of claim 7, wherein an inclined contact surface is defined at one side of a tip of each of the teeth of the clutch ring, wherein a counterpart inclined contact surface is defined at one side of a tip of each of the teeth of the support ring and configured to come into contact with the inclined contact surface, and wherein the inclined contact surface is configured to slide in a state in which the inclined contact surface is in contact with the counterpart inclined contact surface, and the clutch ring and the support ring are configured to mesh with each other.

9. The method of claim 8, wherein the inclined contact surface of the clutch ring has an acute angle with respect to a tip end of each of the teeth of the clutch ring, and the counterpart inclined contact surface of the support ring has an acute angle with respect to a tip end of each of the teeth of the support ring.

10. A method of controlling a power connection device for a four-wheel drive vehicle, the method comprising controlling a clutch ring and a support ring to mesh with each other to constitute any one meshing structure selected from a first meshing structure, a second meshing structure, or a third meshing structure by operating an actuator after determining a driving situation and rotational speeds of left and right driving wheels, wherein the controlling the clutch ring and the support ring to constitute the second meshing structure comprises:

determining which driving wheel has a higher rotational speed between the left and right driving wheels in forward and rearward driving situations and performing speed synchronization to mesh the clutch ring and the support ring with each other; and allowing teeth of the clutch ring to mesh with teeth of the support ring by moving the clutch ring, which is connected to the actuator, in a meshing direction by the operating of the actuator.

11. The method of claim 10, wherein an inclined contact surface is defined at one side of a tip of each of the teeth of the clutch ring, wherein a tip end of each of the teeth of the clutch ring, which excludes the inclined contact surface, is configured as a flat surface, and wherein the inclined contact surface has an obtuse angle with respect to the tip end of each of the teeth of the clutch ring.

12. The method of claim 11, wherein a counterpart inclined contact surface is defined at one side of a tip of each of the teeth of the support ring opposite to the inclined contact surface, wherein a tip end of each of the teeth of the support ring, which excludes the counterpart inclined contact surface, is configured as a flat surface, and wherein the counterpart inclined contact surface has an obtuse angle with respect to the tip end of each of the teeth of the support ring.

13. A method of controlling a power connection device for a four-wheel drive vehicle, the method comprising controlling a clutch ring and a support ring to mesh with each other to constitute any one meshing structure selected from a first meshing structure, a second meshing structure, and a third meshing structure by operating an actuator after determining a driving situation and rotational speeds of left and right driving wheels, wherein the controlling the clutch ring and the support ring to constitute the third meshing structure comprises:

determining which driving wheel has a higher rotational speed between the left and right driving wheels in forward and rearward driving situations and performing speed synchronization to mesh the clutch ring and the support ring with each other; and allowing teeth of the clutch ring to mesh with teeth of the support ring by moving the clutch ring, which is connected to the actuator, in a meshing direction by the operating of the actuator.

14. The method of claim 13, wherein inclined contact surfaces are provided at two opposite sides of a tip of each of the teeth of the clutch ring.

15. The method of claim 14, wherein counterpart inclined contact surfaces are provided at two opposite sides of a tip of each of the teeth of the support ring facing the inclined contact surfaces provided at the two opposite sides of the tip of each of the teeth of the clutch ring.

16. The method of claim 15, wherein a tip end of each of the teeth of the clutch ring, which is positioned between the inclined contact surfaces provided at the two opposite sides of the tip of each of the teeth of the clutch ring, is configured as a flat surface, and each of the inclined contact surfaces has an obtuse angle with respect to the tip end of each of the teeth of the clutch ring.

17. The method of claim 15, wherein a tip end of each of the teeth of the support ring, which is provided between the counterpart inclined contact surfaces provided at the two opposite sides of the tip of each of the teeth of the support ring, is configured as a flat surface, and each of the counterpart inclined contact surfaces has an obtuse angle with respect to the tip end of each of the teeth of the support ring.

18. A method of controlling a power connection device for a four-wheel drive vehicle, the method comprising controlling a clutch ring and a support ring to mesh with each other to constitute any one meshing structure selected from a first meshing structure, a second meshing structure, and a third meshing structure by operating an actuator after determining a driving situation and rotational speeds of left and right driving wheels, wherein the clutch ring is allowed to mesh with the support ring by the operating of the actuator after a speed synchronization is performed by different preset logics in accordance with different conditions including a forward movement, a rearward movement, preset rapid deceleration, and preset rapid acceleration of the four-wheel drive vehicle, and wherein the speed synchronization is performed while the four-wheel drive vehicle travels under a differential condition in which the rotational speed of the left driving wheel is higher than the rotational speed of the right driving wheel or the rotational speed of the right driving wheel is higher than the rotational speed of the left driving wheel.

* * * * *